(12) United States Patent
Okada et al.

(10) Patent No.: US 6,169,146 B1
(45) Date of Patent: Jan. 2, 2001

(54) STYRENE RESIN COMPOSITION AND METHOD OF MANUFACTURING THE SAME, AND METHOD OF MANUFACTURING STYRENE RESIN MOLDED PRODUCTS

(75) Inventors: Akihiko Okada, Ichihara; Takuma Aoyama, Chiba, both of (JP)

(73) Assignee: Idemitsu Petrochemical Co., Ltd., Tokyo (JP)

( * ) Notice: Under 35 U.S.C. 154(b), the term of this patent shall be extended for 0 days.

(21) Appl. No.: 09/228,968

(22) Filed: Jan. 12, 1999

(30) Foreign Application Priority Data

Jan. 29, 1998 (JP) ................................... 10-016713
Jun. 1, 1998 (JP) ................................... 10-151216

(51) Int. Cl.$^7$ ............................ C08L 25/06; C08L 25/08
(52) U.S. Cl. ............................ 525/241; 525/70; 525/98; 525/212; 525/232; 525/238; 525/240; 525/133; 524/508; 524/515
(58) Field of Search ................................ 525/241, 70, 98, 525/232, 238, 212, 240

(56) References Cited

U.S. PATENT DOCUMENTS

| 5,326,813 | 7/1994 | Okada et al. | 524/508 |
|---|---|---|---|
| 5,352,727 | 10/1994 | Okada | 524/495 |
| 5,412,024 | 5/1995 | Okada et al. | 524/577 |
| 5,418,275 | 5/1995 | Okada et al. | 524/504 |
| 5,436,397 | 7/1995 | Okada | 524/494 |
| 5,444,126 | 8/1995 | Okada et al. | 525/391 |
| 5,543,462 | 8/1996 | Okada et al. | 525/74 |
| 5,760,105 | 6/1998 | Okada et al. | 523/201 |
| 5,777,028 | 7/1998 | Okada et al. | 525/86 |
| 5,798,172 | 8/1998 | Funaki et al. | 428/327 |

*Primary Examiner*—Ana Woodward
(74) *Attorney, Agent, or Firm*—Oblon, Spivak, McClelland, Maier & Neustadt, P.C.

(57) ABSTRACT

Disclosed is a resin composition containing the following components (A), and (B) or optionally, (C), (D), and (E):

(A) an atactic polystyrene or a mixture of an atactic polystyrene and a rubber-like elastic substance: 30 to 95 parts by weight;

(B) a syndiotactic polystyrene having a melting point of not higher than 255° C.: 70 to 5 parts by weight;

(C) a polyphenylene ether having an intrinsic viscosity of 0.5 deciliter/g or less as measured in chloroform at 25° C.;

(D) an inorganic filler; and (E) a polymer having compatibility or affinity with components (A) and (B) and having a polar group. The styrene resin composition exhibits improved solvent resistance and remarkable impact resistance. The composition of the invention is produced by kneading the components within a resin temperature range between the melting point of component (B) and 270° C. Resin molded products are manufactured through use of the styrene resin composition by adjusting the resin temperature during molding to fall within the range from the melting point of component (B) to 270° C.

4 Claims, No Drawings

STYRENE RESIN COMPOSITION AND METHOD OF MANUFACTURING THE SAME, AND METHOD OF MANUFACTURING STYRENE RESIN MOLDED PRODUCTS

BACKGROUND OF THE INVENTION

1. Field of the Invention

The present invention relates to a styrene resin composition, particularly to a styrene resin composition comprising a styrene polymer having an atactic structure (hereinafter referred to as an "atactic polystyrene," or abbreviated as APS), or a styrene polymer having an atactic structure and a rubber-like elastic substance; a styrene polymer predominantly having a specific syndiotactic structure (hereinafter referred to as a "syndiotactic polystyrene, or abbreviated as SPS); and, optionally a specific polyphenylene ether (hereinafter abbreviated as PPE); or, an inorganic filler. The present invention also relates to a method of manufacturing the same, and a method of manufacturing styrene resin molded products.

2. Description of the Related Art

Conventionally, APS resins manufactured through radical polymerization have been widely used, because they are inexpensive. However, their atactic steric structure makes APS resins amorphous, thereby imparting unsatisfactory solvent resistance to APS resins. As a result, APS resins have been applicable only to a limited use of material.

In order to overcome such poor solvent resistance, styrene has been copolymerized with a polar monomer such as acrylonitrile, methacrylate, acrylate, maleic anhydride, or maleimide. However, these copolymers have drawbacks in that their copolymerization ratio is limited, their productivity is low, their color is unsatisfactory, they generate unpleasant smell, and recycling is difficult when they are mixed with other polystyrene resins.

Crystalline syndiotactic polystyrene resins have been developed and there have been proposed compositions wherein a syndiotactic polystyrene resin is incorporated in the resin composition of a thermoplastic resin so as to improve its heat resistance (Japanese Patent Application Laid-Open (kokai) Nos. 62-104818, 62-257948, 62-257950, 1-182344). Blending a syndiotactic polystyrene resin with an atactic polystyrene resin improves heat resistance, but does not endow the molded products with satisfactory solvent resistance or impact resistance.

SUMMARY OF THE INVENTION

In view of the foregoing, the present inventors have conducted extensive studies and found that simply blending an SPS having a specific melting point with an APS resin followed by an optional addition of a polyphenylene ether having a specific intrinsic viscosity permits kneading and molding at a temperature which can minimize heat deterioration of APS, and improves moldability and solvent resistance of the resin composition without its impact resistance being deteriorated. The inventors have also found that incorporating an inorganic filler in a predetermined amount allows further improvement of heat resistance and elastic modulus of the resin composition. Moreover, the inventors have found that kneading of each of the components of the resin composition and molding at temperatures falling within a specific temperature range enables efficient manufacture of the resin composition of the present invention and molding thereof. The present invention has been completed based on these findings.

Accordingly, an object of the present invention is to provide an APS resin composition having improved solvent resistance without use of any special compatibility-enhancing agent and having excellent moldability and impact resistance.

Another object of the present invention is to provide a method of manufacturing said APS composition.

Still another object of the present invention is to provide a method of manufacturing APS resin molded products.

In one aspect of the present invention, there are provided following styrene resin compositions;

(1) A styrene resin composition which comprises the following components (A), and (B):
   (A) a styrene polymer having an atactic: 30 to 95 weight %; and
   (B) a styrene polymer having a melting point of not higher than 255° C. and having predominantly a syndiotactic structure: 70 to 5 weight %;

(2) A styrene resin composition which comprises the following components (A), and (B):
   (A) a styrene polymer having an atactic structure and containing a rubber-like elastic substance: 30 to 95 weight %; and
   (B) a styrene polymer having a melting point of not higher than 255° C. and having predominantly a syndiotactic structure: 70 to 5 weight %;

(3) A styrene resin composition which comprises the following components (A), (B), and (C):
   (A) a styrene polymer having an atactic structure or a styrene polymer having an atactic structure and containing a rubber-like elastic substance: 30 to 95 parts by weight;
   (B) a styrene polymer having a melting point of not higher than 255° C. and having predominantly a syndiotactic structure: 70 to 5 weight %; and
   (C) a polyphenylene ether having an intrinsic viscosity of 0.5 deciliter/g or less measured in chloroform at 25° C. in an amount of 1 to 100 parts, preferably 1 to 20 parts, by weight with respect to 100 parts by weight in total of component (A) and component (B);

(4) A styrene resin composition which comprises the following components (A), (B), and (D):
   (A) a styrene polymer having an atactic structure or a styrene polymer having an atactic structure and containing a rubber-like elastic substance: 30 to 95 parts by weight;
   (B) a styrene polymer having a melting point of not higher than 255° C. and having predominantly a syndiotactic structure: 70 to 5 parts by weight; and
   (D) an inorganic filler in an amount of 1 to 70 weight % with respect to total weight of the resin composition.

(5) A styrene resin composition which comprises the following components (A), (B), (D), and (E):
   (A) a styrene polymer having an atactic structure or a styrene polymer having an atactic structure and containing a rubber-like elastic substance: 30 to 95 parts by weight;
   (B) a styrene polymer having a melting point of not higher than 255° C. and having predominantly a syndiotactic structure: 70 to 5 parts by weight;
   (D) an inorganic filler in an amount of 1 to 70 weight % with respect to total weight of the resin composition; and
   (E) a polymer having compatibility or affinity with components (A) and (B) and having a polar group in an amount of 0.1 to 10 parts by weight with respect to 100 parts by weight in total of components (A), (B), and (C).

(6) A styrene resin composition which comprises the following components (A), (B), (C), and (D):

(A) a styrene polymer having an atactic structure or a styrene polymer having an atactic structure and containing a rubber-like elastic substance: 30 to 95 parts by weight;

(B) a styrene polymer having a melting point of not higher than 255° C. and having predominantly a syndiotactic structure: 70 to 5 parts by weight;

(C) a polyphenylene ether having an intrinsic viscosity of 0.5 deciliter/g or less measured in chloroform at 25° C. in an amount of 1 to 100 parts by weight with respect to 100 parts by weight in total of component (A) and component (B); and (D) an inorganic filler in an amount of 1 to 70 weight % with respect to total weight of the resin composition.

(7) A styrene resin composition which comprises the following components (A), (B), (C), (D), and (E):

(A) a styrene polymer having an atactic structure or a styrene polymer having an atactic structure and containing a rubber-like elastic substance: 30 to 95 parts by weight;

(B) a styrene polymer having a melting point of not higher than 255° C. and having predominantly a syndiotactic structure: 70 to 5 parts by weight;

(C) a polyphenylene ether having an intrinsic viscosity of 0.5 deciliter/g or less measured in chloroform at 25° C. in an amount of 1 to 100 parts by weight with respect to 100 parts by weight in total of component (A) and component (B);

(D) an inorganic filler in an amount of 1 to 70 weight % with respect to total weight of the resin composition; and (E) a polymer having compatibility or affinity with components (A) and (B) and having a polar group in an amount of 0.1 to 10 parts by weight with respect to 100 parts by weight in total of components (A), (B), and (C).

In another aspect of the present invention, there is provided a method of producing the styrene resin composition mentioned in the above aspect (1) through (7), which method comprises kneading the respective components within a resin temperature range between the melting point of component (B) and 270° C. inclusive.

In yet another aspect of the present invention, there is provided a method of manufacturing styrene resin molded products through use of the styrene resin composition mentioned in the above aspect (1) through (7), which method comprises molding a composition within a resin temperature range between the melting point of component (B) and 270° C. inclusive as measured during molding.

DESCRIPTION OF THE PREFERRED EMBODIMENTS

Embodiments of the present invention will next be described.

1. Components Which Constitute the Styrene Resin Composition (1) Styrene Polymer Having an Atactic Structure—(Component A)

The styrene polymers having an atactic steric structure that are used in the present invention are polymers which can be produced through solvent polymerization, bulk polymerization, suspension polymerization, or bulk-suspension polymerization, and comprise: a polymer formed of one or more aromatic vinyl compounds represented by the following formula (1); a copolymer of one or more aromatic vinyl compounds and one or more other vinyl monomers which are copolymerizable with the aromatic vinyl compounds; a hydrogenated polymer thereof; and a mixture thereof.

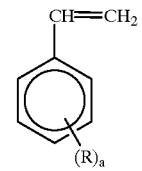

(1)

wherein R represents a hydrogen atom, a halogen atom, or a substituent containing one or more atoms selected from among a carbon atom, an oxygen atom, a nitrogen atom, a sulfur atom, a phosphorus atom, a selenium atom, a silicon atom, and a tin atom; m is an integer between 1 and 3 inclusive, and when m is 2 or 3, a plurality of R's may be identical to or different from one another.

Examples of aromatic vinyl compounds which are preferably used include styrene, α-methylstyrene, methylstyrene, ethylstyrene, isopropylstyrene, tertiary butylstyrene, phenylstyrene, vinylstyrene, chlorostyrene, bromostyrene, fluorostyrene, chloromethylstyrene, methoxystyrene, and ethoxystyrene. These may be used singly or in combination of two or more species. Of these, styrene, p-methylstyrene, m-methylstyrene, p-tertiary butylstyrene, p-chlorostyrene, m-chlorostyrene, and p-fluorostyrene are particularly preferred.

Examples of other copolymerizable vinyl monomers include vinylcyan compounds such as acrylonitrile, or methacrylonitrile; acrylate esters such as methyl acrylate, ethyl acrylate, propyl acrylate, butyl acrylate, amyl acrylate, hexyl acrylate, octyl acrylate, 2-ethylhexyl acrylate, cyclohexyl acrylate, dodecyl acrylate, octadecyl acrylate, phenyl acrylate, or benzyl acrylate; methacrylate esters such as methyl methacrylate, ethyl methacrylate, butyl methacrylate, amyl methacrylate, hexyl methacrylate, octyl methacrylate, 2-ethylhexyl methacrylate, cyclohexyl methacrylate, dodecyl methacrylate, octadecyl methacrylate, phenyl methacrylate, or benzyl methacrylate; maleimide compounds such as maleimide, N-methylmaleimide, N-ethylmaleimide, N-butylmaleimide, N-laurylmaleimide, N-cyclohexylmaleimide, N-phenylmaleimide, or N-(p-bromophenyl)maleimide.

Other copolymerizable vinyl monomers include rubber-like polymers.

Examples of copolymerizable rubber-like polymers include diene rubber such as polybutadiene, a styrene-butadiene copolymer, an acrylonitrile-butadiene copolymer, or polyisoprene; non-diene rubber such as an ethylene-α-olefin copolymer, an ethylene-α-olefin-polyene copolymer, or poly(acrylate ester); a styrene-butadiene block copolymer; a hydrogenated styrene-butadiene block copolymer; an ethylene-propylene elastomer; a styrene-graft-ethylene-propylene elastomer; an ethylenic ionomer resin; and a hydrogenated styrene-isoprene copolymer.

No particular limitation is imposed on the molecular weight of the atactic polystyrene. The weight-average molecular weight of the atactic polystyrene is generally 10,000 or more, preferably 50,000 to 2,000,000. When the weight-average molecular weight is less than 10,000, the resultant molded articles disadvantageously have poor thermal and mechanical properties. Also, no particular limitation is imposed on the molecular weight distribution, and a wide range thereof may be used.

In order to improve the impact resistance, the component (A) may contain, as a constituent thereof, a rubber-like elastic substance in accordance with purposes.

Examples of the rubber-like substance include natural rubber, polybutadiene, polyisoprene, polyisobutylene, neoprene, polysulfide rubber, thiol rubber, acryl rubber, urethane rubber, silicone rubber, epichlorohydrin rubber, a styrene-butadiene block copolymer (SBR), a hydrogenated styrene-butadiene block copolymer (SEB, SBEC), a styrene-butadiene-styrene block copolymer (SBS), a hydrogenated styrene-butadiene-styrene block copolymer (SEBS), a styrene-isoprene block copolymer (SIR), a hydrogenated styrene-isoprene block copolymer (SEP), a styrene-isoprene-styrene copolymer (SIS), a hydrogenated styrene-isoprene-styrene block copolymer (SEPS), ethylene-propylene rubber (EPM), or ethylene-propylene-diene rubber (EPDM). Examples also includes core-shell type granular elastic substances such as butadiene-acrylonitrile-styrene core-shell rubber (ABS), methyl methacrylate-butadiene-styrene core-shell rubber (MBS), methyl methacrylate-butyl acrylate-styrene core-shell rubber (MAS), octyl acrylate-butadiene-styrene core-shell rubber (MABS), alkyl acrylate-butadiene-acrylonitrile-styrene core-shell rubber (AABS), butadiene-styrene core-shell rubber (SBR), or siloxane-containing core-shell rubber such as methyl methacrylate-butyl acrylate-siloxane core-shell rubber, and modified rubber thereof. Of these, SBR, SEB, SBS, SEBS, SIR, SEP, SIS, SEPS, core-shell rubber, EPM, EPDM, and modified rubber thereof are preferred. These elastic substances may be used singly or in combination of two or more species.

The rubber-like elastic substances are incorporated in the component (A) in an amount of 80 wt. % or less, preferably 60 wt. % or less, more preferably 5 to 50 wt. %. Amounts of more than 80 wt. % may cause poor solvent resistance and decreased modulus of elasticity.

(2) Styrene Polymer Predominantly Having a Syndiotactic Structure—(Component B)

In connection with the styrene polymer serving as the component (B) predominantly having a syndiotactic structure, the term "syndiotactic structure" refers to a syndiotactic stereochemical structure wherein phenyl groups serving as side chains bond to the main chain of carbon—carbon bond in alternately opposite directions. The tacticity is quantitatively determined through nuclear magnetic resonance ($^{13}$C-NMR). The thus-measured tacticity is represented by the number denoting a plurality of a continuously linked structural unit, e.g., a diad for two, triad for three, and pentad for five. In the present invention, the term "styrene polymer predominantly having a syndiotactic structure" refers to polystyrene, poly(alkylstyrene), poly(halostyrene), poly(haloalkylstyrene), poly(alkoxystyrene), poly(vinyl benzoate), a hydrogenated polymer thereof, a mixture thereof, or a copolymer predominantly formed thereof, each of them having syndiotacticity, i.e., racemic diad of 75% or more, preferably 85% or more, or racemic pentad of 30% or more, preferably 50% or more. Examples of the poly(alkylstyrene) include poly(methylstyrene), poly(ethylstyrene), poly(isopropylstyrene), poly(tertiary butylstyrene), poly(phenylstyrene), poly(vinylnaphthalene), and poly(chlorostyrene). Examples of the poly(halostyrene) include poly(chlorostyrene), poly(bromostyrene), and poly(fluorostyrene). Examples of the poly(haloalkylstyrene) include poly(chlorostyrene), and examples of the poly(alkoxystyrene) include poly(methoxystyrene) and poly(ethoxystyrene).

Of these, examples of particularly preferably styrene polymers include polystyrene, poly(p-methylstyrene), poly(m-methylstyrene), poly(p-tertiary butylstyrene), poly(p-chlorostyrene), poly(m-chlorostyrene), poly(p-fluorostyrene), hydrogenated polystyrene, and a copolymer having a structural unit derived from these polymers.

These styrene polymers predominantly having a syndiotactic structure may be produced through known methods. For example, mention may be given of a method in which styrenic monomers (corresponding to monomers producing the above styrene polymers) are polymerized in an inert hydrocarbon solvent or, in the absence of a solvent, with a catalyst comprising a titanium compound and a condensate of water and trialkylaluminum (see, for example, Japanese Patent Application Laid-Open (kokai) No. 62-187708). Similarly, poly(haloalkylstyrene) and a hydrogenated polymer thereof may be produced through a known method described in Japanese Patent Application Laid-Open (kokai) Nos. 1-46912, 1-178505, etc.

In the present invention, SPS which is used as the component (B) must have a melting point of 255° C. or less. SPS used as the component (B) has a melting point of preferably 100–255, more preferably 210–250. No particular limitation is imposed on the SPS so long as it has a melting point of 255° C. or less, and there may be used a copolymer predominantly having a syndiotactic structure formed of styrene and a substituted styrene, a styrene polymer having low tacticity, etc. Of these, styrene-alkylstyrene copolymers such as a styrene-p-methylstyrene copolymer or a styrene-t-butylstyrene copolymer are preferably used.

No particular limitation is imposed on the molecular weight, and it is typically 10,000 or more, preferably 50,000–1,000,000, on a weight-average basis. Furthermore, no particular limitation is imposed on the molecular weight distribution, and a wide range thereof may be used. When the weight-average molecular weight is less than 10,000, obtained molded articles disadvantageously have poor thermal and mechanical properties.

These styrene polymers having such syndiotactic structure may be used singly or in combination of two or more species.

(3) Polyphenylene ether—(Component C)

Polyphenylene ether serving as the component (C) is a known compound, and for the purposes of the present invention, reference may be made to U.S. Pat. Nos. 3,306,874, 3,306,875, 3,257,357, and 3,257,358. Polyphenylene ether is typically prepared through oxidative coupling reaction to form a homopolymer or copolymer in the presence of a copper amine complex and one or more di- or tri-substituted phenols. With regard to the copper amine complex, there may be used a copper amine complex derived from a primary, secondary, or tertiary amine. Examples of the polyphenylene ether include poly(2,3-dimethyl-6-ethyl-1,4-phenylene ether), poly(2-methyl-6-chloromethyl-1,4-phenylene ether), poly(2-methyl-6-hydroxyethyl-1,4-phenylene ether), poly(2-methyl-6-n-butyl-1,4-phenylene ether), poly(2-ethyl-6-isoproyl-1,4-phenylene ether), poly(2-ethyl-6-n-propyl-1,4-phenylene ether), poly(2,3,6-trimethyl-1,4-phenylene ether), poly(2-(4'-methylphenyl)-1,4-phenylene ether), poly(2-bromo-6-phenyl-1,4-phenylene ether), poly(2-methyl-6-phenyl-1,4- phenylene ether), poly(2-phenyl-1,4-phenylene ether), poly (2-chloro-1,4-phenylene ether), poly(2-methyl-1,4-phenylene ether), poly(2-chloro-6-ethyl-1,4-phenylene ether), poly(2-chloro-6-bromo-1,4-phenylene ether), poly(2,6-di-n-propyl-1,4-phenylene ether), poly(2-methyl-6-isopropyl-1,4-phenylene ether), poly(2-chloro-6-methyl-1,4-phenylene ether), poly(2-methyl-6-ethyl-1,4-phenylene ether), poly(2,6-dibromo-1,4-phenylene ether), poly(2,6-dichloro-1,4-phenylene ether), poly(2,6-diethyl-1,4-phenylene ether), and poly(2,6-dimethyl-1,4-phenylene ether). For example, there may be suitably used a copolymer which is derived from two or more phenol compounds used in preparation of the above-described homopolymer. Such a copolymer which is further modified with an agent such as maleic anhydride or fumaric acid is also preferably used. Furthermore, there may be also suitable a graft copolymer and a block copolymer of an aromatic vinyl compound such as polystyrene and the above-described polyphenylene ethers.

Of these, in particular, poly(2,6-dimethyl-1,4-phenylene ether) is preferably used. The intrinsic viscosity of the polyphenylene ethers serving as the component (C) is preferably 0.5 dl/g or less, more preferably 0.45–0.30 dl/g, as measured at 25° C. in chloroform. When the viscosity is in excess of 0.5 dl/g, effect of the component (B) serving as a dispersing agent diminishes and effect on enhancing impact resistance may disadvantageously become poor.

(4) Inorganic Filler—(Component D)

No particular limitation is imposed on the form of the inorganic filler serving as the component (D). Fibrous, granular, and powder fillers may be used. Examples of the fibrous filler include glass fiber, carbon fiber, and whiskers. Examples of the form of the filler include cloth, mat, cut-bundle, chopped fiber, filaments, and whiskers. The cut-bundle filler preferably has a length of 0.05–50 mm and a fiber diameter of 5–20 $\mu$m.

Examples of granular or powder fillers include talc, carbon black, graphite, titanium dioxide, silica, mica, calcium carbonate, calcium sulfate, barium carbonate, magnesium carbonate, magnesium sulfate, barium sulfate, oxysulfate, tin oxide, alumina, kaolin, silicon carbide, metal powder, glass powder, glass flakes, and glass beads.

Among the above fillers, glass fillers such as glass powder, glass flake, glass beads, glass filaments, glass fiber, glass roving, and glass mat are particularly preferred.

These fillers are preferably surface-treated. A coupling agent for surface treatment is used in order to enhance adhesion between the filler and resin, and there may be used an arbitrary member selected from among known coupling agents such as silane coupling agents and titanium coupling agents. Of these, there are preferred aminosilanes such as $\gamma$-aminopropyltrimethoxysilane, N-$\beta$-(aminoethyl)-$\gamma$-aminopropyltrimethoxysilane, $\gamma$-glycidoxypropyltrimethoxysilane, or $\beta$-(3,4-epoxycyclohexyl)ethyltrimethoxysilane; epoxysilanes; and isopropyltri (N-amindoethyl, aminoethyl) titanate.

In addition, known film-formers may be used. Among them, a urethane, an epoxy, and a polyether compound are preferably used. These inorganic fillers may be used singly or in combination of two or more species.

(5) Polymer Having Compatibility or Affinity with Component (A) and Component (B) and Containing a Polar Group—(Component E)

In order to enhance adhesion between the inorganic filler serving as the component (D) and resin, there is preferably incorporated as the component (E) a polymer having compatibility or affinity with the component (A) and component (B) and containing a polar group.

As used herein, the term "polymer having compatibility or affinity with the component (A) and component (B)" refers to a polymer containing a chain having compatibility or affinity with the component (A) and component (B) in the polymer chains. Examples of the polymer having compatibility or affinity include polymers containing, as the main chain, block chain, or graft chain, syndiotactic polystyrene, atactic polystyrene, isotactic polystyrene, styrene copolymers, polyphenylene ether, poly(vinyl methyl ether), etc.

No particular limitation is imposed on the polar group contained in the component (E) so long as the group enhances adhesion between the inorganic filler (D) and resin. Examples thereof include an acid anhydride group, a carboxylate group, a carboxylate ester group, a carboxylic acid chloride group, a carboxamido group, a base carboxylate group, a sulfonate group, a sulfonate ester group, a sulfonic acid chloride group, a sulfonamido group, a base sulfonate group, an epoxy group, an amino group, an imido group, and an oxazoline group.

The component (E) may be produced by reacting a polymer having compatibility or affinity with the above component (A) and component (B) and the below-described modifying agent in the presence of a solvent and in the presence or absence of another resin. For example, there may be used a compound having both an ethylenic double bond and a polar group in the molecule. Specific examples include maleic acid derivatives such as maleic anhydride, maleic acid, maleate esters, maleimides, N-substituted maleimides, and maleate salts; fuamric acid derivatives such as fumaric acid, fumarate esters, and fumarate salts; itaconic acid derivatives such as itaconic anhydride, itaconic acid, itaconate esters, and itaconate salts; acrylic acid derivatives such as acrylic acid, acrylate esters, acrylamide, and acrylate salts; and methacrylic acid dervatives such as methacrylic acid, methacrylate esters, methacrylamide, methacrylate salts, and glycidyl methacrylate. Of these, in particular, maleic anhydride, fumaric acid, and glycidyl methacrylate are preferably used.

Modification is performed through known methods such as melt-kneading at 150° C.–350° C. by use of a roll mill, a Banbury mixer, an extruder, etc. so as to cause reaction; or thermally reacting in a solvent such as benzene, toluene, or xylene. In order to facilitate the reaction, there is effectively added to a reaction system a radical generator such as benzoyl peroxide, di-t-butyl peroxide, dicumyl peroxide, t-butyl peroxybenzoate, azobisisobutyronitrile, azobisisovaleronitrile, or 2,3-diphenyl-2,3-dimethylbutane. Of these, in particular, 2,3-diphenyl-2,3-dimethylbutane is preferably used.

Melt-kneading in the presence of a radical generator is also a preferable method, and another resin may be added during the modification step.

Specific examples of the component (E) include modified styrene polymers such as a styrene-maleic anhydride copolymer (SMA), a styrene-glycidyl methacrylate copolymer, carboxylic acid-terminated polystyrene, epoxy-terminated polystyrene, oxazoline-terminated polystyrene, amine-terminated polystyrene, sulfonated polystyrene, a styrenic ionomer, a styrene-methyl methacrylate graft copolymer, a (styrene-glycidyl methacrylate)-methyl methacrylate graft copolymer, an acid-modified acrylic monomer-styrene graft copolymer, a (styrene-glycidyl methacrylate)-styrene copolymer, a polybutylene terephthalate-polystyrene graft copolymer, maleic anhydride-modified polystyrene, fumaric acid-modified polystyrene, glycidyl methacrylate-modified polystyrene, or amine-modified polystyrene; and modified polyphenylene ethers such as a (styrene-maleic anhydride)-polyphenylene ether graft copolymer, maleic anhydride-modified polyphenylene ether, glycidyl methacrylate-modified polyphenylene ether, or amine-modified polyphenylene ether.

Of these, in particular, modified polystyrene and modified polyphenylene ether are preferably used. The above polymers may be used in combination of two or more species.

The amount of the polar group in the component (E) is preferably 0.01–20 wt. %, more preferably 0.05–10 wt. %, based on 100 wt. % of the component (E). When the amount is less than 0.01 wt. %, the component (E) must be added in a large amount so as to ensure adhesion effect to an inorganic filler. This may disadvantageously deteriorate dynamic properties, heat resistance, and moldability of the composition. In contrast, amounts in excess of 20 wt. % may disadvantageously deteriorate compatibility to the component (A) and the component (B).

(6) Other Additives

In the resin compositions of the present invention, so long as the effect of the invention is not impeded, additives may be incorporated in addition to components (A) through (E). Examples of such additives include nucleating agents, plasticizers, mold releasing agents, antioxidants, flame retardants, flame-retarding aids, thermoplastic resins, dyes, pigments, antistatic agents and the like. These additives may be used singly or in combination of two or more species.

(a) Nucleating Agents

The nucleating agents may be added in order to accelerate crystallization of SPS and to enhance resistance to solvents. Any conventional nucleating agents may be used e.g., metal carboxylates such as aluminum di-(p-t-butylbenzoate); metal phosphates such as sodium methylenebis(2,4-di-t-butylphenol)phosphate; talc; and phthalocyanine derivatives.

(b) Plasticizers

Any conventional plasticizers may be used, e.g., polyethylene glycol, polyamide oligomers, ethylene bis-stearamide, phthalate esters, polystyrene oligomers, polyethylene wax, mineral oil, and silicone oil.

(c) Mold Releasing Agents

Any conventional mold releasing agents may be used, e.g., polyethylene wax, silicone oil, long-chain carboxylic acids, long-chain carboxylic acid metal salts.

(d) Antioxidants

Any conventional antioxidants may be used, e.g., any of antioxidants formed of phosphorus compounds, phenol compounds, sulfur compounds or the like.

(e) Flame Retardants and Flame Retarding Aids

Any conventional flame retardants may be used, e.g. brominated polymers such as brominated polystrene, brominated syndiotactic polystyrene or brominated polyphenylene ether; brominated aromatic compounds such as brominated diphenylalkane or brominated diphenyl ether; phosphorus compound flame retardants such as tricresyl phosphate, triphenyl phosphate, or tris(3-chloropropyl) phosphate. Any conventional frame retarding aids may also be used, e.g., antimony compounds such as antimony trioxide. Any conventional dripping-prevention agents may be used, e.g., Teflon.

(f) Thermoplastic Resins

Any conventional thermoplastic resins may be used, e.g., polyolefins such as linear high density polyethylene, linear low density polyethylene, high-pressure low density polyethylene, isotactic polypropylene, syndiotactic polypropylene, propylene α-olefin block copolymer, propylene α-olefin random copolymer, polybutene, 1,2-polybutadiene, cyclic polyolefins and poly-4-methylpentene; polystyrene resins such as polysyrene, HIPS, ABS, AS or SMA; polyester resins such as polycarbonate, polyethylene terephthalate or polybutylene terephthalate; polyamide resins such as polyamide 6 or polyamide 6,6; and polyarylene sulfide resins and the like.

2. Proportions of the Components Constituting the Styrene Resin Composition (1) With regard to the above component (A) and component (B), the proportion of the component (A), i.e., the amount of atactic polystyrene (APS) or the total amount of APS and rubber-like elastomer, is 30–95 wt. %, preferably 50–90 wt. %, more preferably 60–85 wt. %, and the proportion of syndiotactic polystyrene (SPS) serving as the component (B) is 70–5 wt. %, preferably 50–10 wt. %, more preferably 40–15 wt. %, based on the total weight of components (A) and (B). If the proportion of the component (B) is less than 5 wt. %, the effect of the solvent resistance may be insufficient whereas when it is in excess of 70 wt. %, the characteristics of APS becomes poor to cause possible deterioration of the impact resistance.

(2) The proportion of the above component (C) is 1–100 parts by weight, preferably 3–80 parts by weight, more preferably 1–20 parts by weight, based on 100 parts by weight in total of components (A) and (B). When the proportion is less than 1 part by weight, the enhancement effect on the impact resistance is poor, whereas when it is in excess of 100 parts by weight, flowability of the composition may deteriorate to cause gelation in the composition.

(3) The proportion of the inorganic fillers serving as the component (D) is 1–70 wt. %, preferably 5–50 wt. %, based on 100 parts by weight in total of the above-described components (A), (B), (C), (D), and (E), and other components. When the proportion is less than 1 wt. %, effect of the inorganic fillers is poor, whereas when it is in excess of 70 wt. %, dispersibility may deteriorate to cause poor moldability.

(4) The proportion of the above component (E) is 0.1–10 parts by weight, preferably 0.5–8 parts by weight, more preferably 1–5 parts by weight, based on 100 parts by weight in total of the above-described components (A) and (B) or a total amount of the above-described components (A), (B), and (C). When the proportion is less than 0.1 part by weight, effect of the adhesion to the inorganic fillers serving as the component (D) is insufficient to cause poor adhesion between the fillers and resin; whereas when it is in excess of 10 parts by weight, adhesion commensurate with the increase in amounts cannot be obtained, thereby inducing disadvantages in economy.

3. Method for Preparing the Styrene Resin Composition of the Present Invention

No particular limitation is imposed on the method for preparing the styrene resin composition of the present invention, and it can be prepared through known methods. For example, the resin composition of the present invention can be obtained through melt-kneading by use of kneading apparatus such as a ribbon blender, Henschel mixer, Banbury mixer, drum tumbler, single screw extruder, twin screw extruder, co-kneader, or multi-screw extruder.

The temperature of resin during melt-kneading is between the melting point of SPS and 270° C. inclusive, preferably between the melting point of SPS and 265° C. inclusive, more preferably between the melting point of SPS and 260° C. inclusive. When the temperature is less than the melting point of SPS, the dispersion condition of SPS may deteriorate to cause poor enhancement effect on solvent resistance and poor impact resistance, whereas when it is in excess of 270° C., APS may deteriorate to cause poor impact resistance.

4. Method for Molding the Styrene Resin Composition According to the Present Invention No particular limitation is imposed on the method for molding, and the composition can be molded through a known method such as injection molding or extrusion.

The temperature of resin during molding is regulated to fall between the melting point of SPS and 270° C. inclusive, preferably between the melting point of SPS and 265° C. inclusive, more preferably between the melting point of SPS and 260° C. inclusive. When the temperature is lower than the melting point of SPS, the composition may be unsatisfactory in terms of flowability, impact resistance, and surface appearance; whereas when it is in excess of 270° C., APS may disadvantageously deteriorate and moldability may be lowered (i.e., unsatisfactory mold cycles and generation of sink marks).

The temperature of a metallic mold (actual temperature) is preferably 30–100° C. When the temperature is less than 30° C., the molded products may have bad appearance; whereas when it is in excess of 100° C., productivity may deteriorate.

5. Use of the Styrene Resin Composition of the Present Invention

The styrene resin composition of the present invention can be provided for a wide range of uses without particular limitation. Examples of automotive parts to which the composition is preferably applied include exterior parts such as radiator grilles, grilles, emblems, back panels, door mirrors, wheel caps, air spoilers, and cowls for two-wheeled vehicles; and interior parts such as instrument panels, meter hoods, pillars, glove boxes, console boxes, speaker boxes, and lids. Examples of parts for electric appliances include parts for audio-visual apparatus, such as housings, chassis, cassette cases, CD magazines, and remote-controller cases; parts for refrigerators such as inner linings, trays, arms, door caps, and door handles; parts for vacuum cleaners such as housings, carrying handles, pipes, and intake openings; parts for air-conditioners, such as housings, fans, and remote-controller cases; and parts for fans, ventilators, washers, lights, and battery cases. Examples of parts for general apparatus include parts for printers and copiers, such as housings, chassis, ribbon cassettes, and trays; and parts for personal computers, such as housings, floppy-disk shells, and keyboards. Examples of parts for telephones and other communication apparatus include housings, receivers, and mechanical chassis, and parts for other apparatus such as sewing machines, registers, typewriters, calculators, optical apparatus, and musical instruments. Furthermore, the composition may be used in general goods,toys and equipment for leisure-time amusement or sporting goods, such as remote-controlled cars, blocks, pinball machine parts, surfboards, and helmets. The use is also directed to hygiene articles such as toilet seats, toilet seat covers, toilet tanks, and parts for shower systems; household articles such as lunch boxes, containers, and pots; building materials; furniture; and stationery goods. With regard to industrial structural materials, the composition is preferably used for pipes, containers, trays, uniaxially or biaxially drawn film obtained through extrusion and drawing, sheets, and fibrous molded products obtained by spinning.

EXAMPLES

The present invention will now be described in detail by way of examples and comparative examples. However, the present invention is not limited thereto.

Evaluation Method

Impact strength (notched): Impact strength (notched) was measured in accordance with JIS K7110.

Solvent resistance:

(1) Stress Crack Resistance

As a solvent, a surfactant (a) (by Kao Corporation, trade name: Bath Magiclin), soybean oil (b), or MCT oil (c) (by Riken Vitamins, trade name: Acter Ml) was used to determine stress crack resistance. The measuring method was as follows:

By use of a 0.8% bending jig, the samples were fixed at the bent portion of the jig. Each solvent was applied dropwise to a piece of gauze placed on the upper surface of the bent portion of the sample such that the solvent penetrated through the gauze. Then, the samples which had been brought into contact with surfactant (a) and soybean oil (b) were allowed to stand at 80° C. in an oven for one hour, and the samples which had been brought into contact with MCT oil (c) were allowed to stand at room temperature for one hour. Changes in appearance of the samples were visually observed. The samples where no changes were observed were marked with A, the samples where almost no changes were observed were marked with B, the samples where crazing was observed were marked with C, and the samples which generated cracks or which were broken were marked with D.

(2) Dipping Test The samples were dipped in freon (CFC) 141B at room temperature for one hour, and changes in appearance were visually observed. The samples where no changes were observed were marked with A, the samples where almost no changes were observed were marked with B, the samples where small changes were observed were marked with C, and the samples where significant changes were observed were marked with D.

Materials

Component (A)

(a) High-impact Polystyrene (HIPS)

Manufactured by Idemitsu Petrochemical, trade name: HT55

(b) General-use Polystyrene (GPPS)

Manufactured by Idemitsu Petrochemical, trade name: HH31S (c) Rubber-like elastic substance G1651: SEBS type rubber-like elastic substance
(Manufactured by Shell, trade name: Clayton G1651)
D1101: SEBS type rubber-like elastic substance
(Manufactured by Shell, trade name: Clayton D1101)

Component (B) (SPS)

Weight-average molecular weights and molecular-weight distributions were measured by use of gel permeation chromatography (GPC) at 130° C. using 1,2,4-trichlorobenzene as a solvent. Melting points were determined by differential thermal analysis (DSC) based on the peak positions when the temperature was raised at a rate of 20° C./minute. The following SPSs were manufactured by use of a known method described in Japanese Patent Application Laid-Open (kokai) Nos. 104818/1987 and 187708/1987.

SPS 1: styrene-p-methylstyrene copolymer
(p-methylstyrene content: 12 mol%)
Weight-average molecular weight Mw=180,000, Mw/Mn=2.3
Melting point: 240° C.

SPS 2: styrene-p-methylstyrene copolymer
(p-methylstyrene content: 12 mol%)
Weight-average molecular weight Mw=300,000, Mw/Mn=2.5
Melting point: 240° C.

SPS 3: styrene-p-methylstyrene copolymer
(p-methylstyrene content: 7 mol%)

Weight-average molecular weight Mw=300,000, Mw/Mn=2.5

Melting point: 253° C.

SPS 4: styrene homopolymer (p-methylstyrene content: 12 mol%)

Weight-average molecular weight Mw=300,000, Mw/Mn=2.5

Melting point: 270° C.

Polyphenylene Ether (C)

Intrinsic viscosity described below was measured in chloroform at 25° C. Each PPE was manufactured by use of a known method described in U.S. Pat. Nos. 3,306,874, 3,306,875, and 3,257,357.

PPE 1: poly (2,6-dimethyl-1,4-phenylene ether)

Intrinsic viscosity: 0.41 deciliter/g

PPE 2: poly (2,6-dimethyl-1,4-phenylene ether)

Intrinsic viscosity: 0.45 deciliter/g

PPE 3: poly (2,6-dimethyl-1,4-phenylene ether)

Intrinsic viscosity: 0.51 deciliter/g

Component (D)

GF: Glass Fiber (Manufactured by Asahi Fiberglass, trade name: FT164)

Polyphenylene ether (intrinsic viscosity: 0.45 dl/g, in chloroform, at 25° C.) (1 kg), fumaric acid (30 g), and 2,3-dimethyl-2,3-diphenylbutane (by Nihonyushi; Nofmer BC) (20 g) serving as a free radical initiator were dry-blended and then melt-kneaded by use of a double-screw extruder (30 mm) at a screw speed of 200 rpm at 300° C. Strands were cooled, followed by pelletization, to thereby obtain fumaric-acid-modified polyphenylene ether. In order to determine the modification ratio, the resultant modified polyphenylene ether (1 g) was dissolved in ethylbenzene, and was precipitated in methanol. The recovered polymer was subjected to Soxhlet extraction using methanol, and then dried. Absorption intensity of carbonyl in IR spectrum was measured and the modification ratio was measured by titration. The modification ratio was found to be 1.6 wt %.

Example 1

High-impact Polystyrene (HIPS) (manufactured by Idemitsu Petrochemical, trade name: HT55) (90 parts by weight) serving as component (A), syndiotactic polystyrene (SPS-1) (10 parts by weight) serving as component (B), and (2,6-di-t-butyl-4-methylphenyl) pentaerythritol diphosphite (by Asahi Denka; PEP-36) (0.1 parts by weight with respect to 100 parts of the total amount of component (A) and component (B)) serving as an antioxidant, and tetrakis (methylene-3-(3', 5'-di-t-butyl-4'-hydroxyphenyl)) propionate (by Adeka-Agas; MARKAO 60) (0.1 parts by weight) were mixed and dry-blended in a Henschel mixer. The ingredients were melt-kneaded by use of a double-screw extruder and pelletized. The resin temperature was 255° C. The resultant pellets were injection molded at a resin temperature of 260° C. and at a mold temperature of 60° C. to prepare Izod test samples and bending test samples. The test samples were tested for Izod impact strength and solvent resistance. The results are shown in Tables 1 and 2.

Examples 2 to 39. Comparative Examples 1 to 24, and Reference Examples 1 to 10

The procedure of Example 1 was repeated under the same conditions except that the ingredients and compositional proportions shown in Tables 1, 3, 5, and 7 were used for components (A), (B), (C), and that resin temperatures in kneading process and in molding process were changed to those described in Tables 1, 3, 5, and 7. The results are shown in Tables 2, 4, 6, and 8.

TABLE 1

| | Composition | | | | | | | | | | | | |
|---|---|---|---|---|---|---|---|---|---|---|---|---|---|
| | Component (A) | | | | (Component B) | | | (Component C) Polyphenylene ether | | Component (E) See Production Example | Component (D) | | Knead-ing | Mold-ing |
| Ex., Comp. Ex., and Ref. Ex. | APS resin | | Rubber-like elastic substance | | SPS resin | | | | | | (D) Inorganic filler | | Resin temp. ° C. | Resin temp. ° C. |
| | Type | Parts by weight | Type | Parts by weight | Type | m.p. | Parts by weight | Type | Parts by weight | Parts by weight | Type | wt. % | | |
| Ex. 1 | HT55 | 90 | — | 0 | SPS-1 | 240 | 10 | — | 0 | 0 | — | 0 | 255 | 260 |
| Ex. 2 | HT55 | 70 | — | 0 | SPS-1 | 240 | 30 | — | 0 | 0 | — | 0 | 245 | 260 |
| Ex. 3 | HT55 | 70 | — | 0 | SPS-1 | 240 | 30 | — | 0 | 0 | — | 0 | 255 | 260 |
| Ex. 4 | HT55 | 70 | — | 0 | SPS-1 | 240 | 30 | — | 0 | 0 | — | 0 | 255 | 270 |
| Ex. 5 | HT55 | 70 | — | 0 | SPS-1 | 240 | 30 | — | 0 | 0 | — | 0 | 255 | 245 |
| Ex. 6 | HH55 | 70 | — | 0 | SPS-1 | 240 | 30 | — | 0 | 0 | — | 0 | 265 | 260 |
| Ex. 7 | HT55 | 50 | — | 0 | SPS-1 | 240 | 50 | — | 0 | 0 | — | 0 | 255 | 260 |
| Ex. 8 | HT55 | 90 | — | 0 | SPS-2 | 240 | 10 | — | 0 | 0 | — | 0 | 255 | 260 |
| Ex. 9 | HTS5 | 70 | — | 0 | SPS-2 | 240 | 30 | — | 0 | 0 | — | 0 | 245 | 260 |
| Ex. 10 | HT55 | 70 | — | 0 | SPS-2 | 240 | 30 | — | 0 | 0 | — | 0 | 255 | 260 |
| Ex. 11 | HT55 | 70 | — | 0 | SPS-2 | 240 | 30 | — | 0 | 0 | — | 0 | 265 | 260 |
| Ex. 12 | HT55 | 50 | — | 0 | SPS-2 | 240 | 50 | — | 0 | 0 | — | 0 | 255 | 260 |
| Ex. 13 | HTS5 | 90 | — | 0 | SPS-3 | 253 | 10 | — | 0 | 0 | — | 0 | 265 | 260 |
| Ex. 14 | HT55 | 70 | — | 0 | SPS-3 | 253 | 30 | — | 0 | 0 | — | 0 | 255 | 260 |
| Ex. 15 | HT55 | 70 | — | 0 | SPS-3 | 253 | 30 | — | 0 | 0 | — | 0 | 265 | 260 |
| Ex. 16 | HT55 | 50 | — | 0 | SPS-3 | 253 | 50 | — | 0 | 0 | — | 0 | 265 | 260 |
| Ex. 17 | HT55 | 60 | G1651 | 10 | SPS-1 | 240 | 30 | — | 0 | 0 | — | 0 | 255 | 260 |
| Ex. 18 | HT55 | 60 | D110I | 10 | SPS-1 | 240 | 30 | — | 0 | 0 | — | 0 | 255 | 260 |
| Ex. 19 | HH31S | 60 | G1651 | 10 | SPS-1 | 240 | 30 | — | 0 | 0 | — | 0 | 255 | 260 |
| Ex. 20 | HH31S | 60 | D1101 | 10 | SPS-1 | 240 | 30 | — | 0 | 0 | — | 0 | 255 | 260 |

TABLE 2

| Ex., Comp. Ex., and Ref. Ex. | Moldability Deformation upon release from mold | Molded product Shrink (Visual observation) | Surface Appearance (Visual observation) | Impact strength Izot with notch JIS-K7110 kJ/m² | Resistance to solvent Bath Magiclin Stress cracks Strain = 0.8% 80° C. × 1 hr | Soybean oil Stress cracks Strain = 0.8% 80° C. × 1 hr | MCT oil Appearance Strain = 0.8% r.t. × 1 hr | Freon 141B change r.t. × 1 hr |
|---|---|---|---|---|---|---|---|---|
| Ex. 1 | B | B | B | 10.2 | B | C | C | C |
| Ex. 2 | B | B | B | 8.4 | A | B | B | C |
| Ex. 3 | B | B | B | 8.3 | A | B | B | C |
| Ex. 4 | B | B | B | 8.3 | A | B | B | C |
| Ex. 5 | B | B | B | 8.4 | A | B | B | C |
| Ex. 6 | B | B | B | 8.2 | A | B | B | C |
| Ex. 7 | B | B | B | 7.0 | A | A | A | B |
| Ex. 8 | B | B | B | 10.0 | B | C | C | C |
| Ex. 9 | B | B | B | 8.2 | A | B | B | C |
| Ex. 10 | B | B | B | 8.1 | A | B | B | C |
| Ex. 11 | B | B | B | 8.1 | A | B | B | C |
| Ex. 12 | B | B | B | 6.8 | A | A | A | B |
| Ex. 13 | B | B | B | 9.8 | B | C | C | C |
| Ex. 14 | B | B | B | 8.1 | A | B | B | C |
| Ex. 15 | B | B | B | 8.0 | A | B | B | C |
| Ex. 16 | B | B | B | 6.6 | A | A | A | B |
| Ex. 17 | B | B | B | 13.6 | B | B | B | C |
| Ex. 18 | B | B | B | 14.6 | B | B | B | C |
| Ex. 19 | B | B | B | 6.6 | A | B | B | C |
| Ex. 20 | B | B | B | 7.1 | A | B | B | C |

TABLE 3

| | Composition | | | | | | | | | | | |
|---|---|---|---|---|---|---|---|---|---|---|---|---|
| | Component (A) | | | | (Component B) SPS resin | | (Component C) Polyphenylene ether | | Component (E) See Production Example | Component (D) Inorganic filler | | Kneading Resin temp. ° C. | Molding Resin temp. ° C. |
| | APS resin | | Rubber-like elastic substance | | | | | | | | | | |
| Ex., Comp. Ex., and Ref. Ex. | Type | Parts by weight | Type | Parts by weight | Type | m.p. | Parts by weight | Type | Parts by weight | Parts by weight | Type | wt. % | | |
| Comp. Ex. 1 | HT55 | 100 | — | 0 | — | — | 0 | — | 0 | 0 | — | 0 | 255 | 260 |
| Comp. Ex. 2 | HT55 | 95 | — | 0 | SPS-1 | 240 | 5 | — | 0 | 0 | 0 | 255 | 260 | |
| Comp. Ex. 3 | HT55 | 20 | — | 0 | SPS-1 | 240 | 80 | — | 0 | 0 | 0 | 255 | 260 | |
| Comp. Ex. 4 | HT55 | 70 | — | 0 | SPS-1 | 240 | 30 | — | 0 | 0 | — | 0 | 255 | 280 |
| Comp. Ex. 5 | HT55 | 70 | — | 0 | SPS-1 | 240 | 30 | — | 0 | 0 | — | 0 | 255 | 230 |
| Comp. Ex. 6 | HH55 | 90 | — | 0 | SPS-4 | 270 | 10 | — | 0 | 0 | — | 0 | 280 | 280 |
| Comp. Ex. 7 | HT55 | 70 | — | 0 | SPS-4 | 270 | 30 | — | 0 | 0 | — | 0 | 245 | 280 |
| Comp. Ex. 8 | HT55 | 70 | — | 0 | SPS-4 | 270 | 30 | — | 0 | 0 | — | 0 | 255 | 280 |
| Comp. Ex. 9 | HT55 | 70 | — | 0 | SPS-4 | 270 | 30 | — | 0 | 0 | — | 0 | 265 | 280 |
| Comp. Ex. 10 | HT55 | 70 | — | 0 | SPS-4 | 270 | 30 | — | 0 | 0 | — | 0 | 280 | 280 |
| Comp. Ex. 11 | HT55 | 50 | — | 0 | SPS-4 | 270 | 50 | — | 0 | 0 | — | 0 | 280 | 280 |
| Comp. Ex. 12 | HT55 | 60 | G1651 | 10 | SPS-4 | 270 | 30 | — | 0 | 0 | — | 0 | 280 | 280 |
| Comp. Ex. 13 | HT55 | 60 | D1101 | 10 | SPS-4 | 270 | 30 | — | 0 | 0 | — | 0 | 280 | 280 |
| Comp. Ex. 14 | HH31S | 60 | G1651 | 10 | SPS-4 | 270 | 30 | — | 0 | 0 | — | 0 | 280 | 280 |
| Comp. Ex. 15 | HH31S | 60 | D1101 | 10 | SPS-4 | 270 | 30 | — | 0 | 0 | — | 0 | 280 | 280 |
| Ref. Ex. 1 | HT55 | 70 | — | 0 | SPS-1 | 240 | 30 | — | 0 | 0 | — | 0 | 230 | 260 |
| Ref. Ex. 2 | HT55 | 70 | — | 0 | SPS-2 | 240 | 30 | — | 0 | 0 | — | 0 | 230 | 260 |
| Ref. Ex. 3 | HT55 | 70 | — | 0 | SPS-3 | 253 | 30 | — | 0 | 0 | — | 0 | 230 | 260 |
| Ref. Ex. 4 | HT55 | 70 | — | 0 | SPS-1 | 240 | 30 | — | 0 | 0 | — | 0 | 280 | 260 |
| Ref. Ex. 5 | HT55 | 70 | — | 0 | SPS-2 | 240 | 30 | — | 0 | 0 | — | 0 | 280 | 260 |
| Ref. Ex. 6 | HT55 | 70 | — | 0 | SPS-3 | 253 | 30 | — | 0 | 0 | — | 0 | 280 | 260 |

TABLE 4

| Ex., Comp. Ex., and Ref. Ex. | Moldability Deformation upon release from mold | Molded product Shrink (Visual observation) | Surface Appearance (Visual observation) | Impact strength Izot with notch JIS-K7110 kJ/m² | Resistance to solvent Bath Magiclin Stress cracks Strain = 0.8% 80° C. × 1 hr | Soybean oil Stress cracks Strain = 0.8% 80° C. × 1 hr | MCT oil Appearance Strain = 0.8% r.t. × 1 hr | Freon 141B change r.t. × 1 hr |
|---|---|---|---|---|---|---|---|---|
| Comp. Ex. 1 | B | B | B | 10.5 | D | D | D | D |
| Comp. Ex. 2 | B | B | B | 10.3 | D | D | *D | D |
| Comp. Ex. 3 | B | B | B | 2.7 | A | A | A | B |
| Comp. Ex. 4 | D | D | B | 7.2 | B | B | B | C |
| Comp. Ex. 5 | B | B | D | 3.4 | C | C | D | D |
| Comp. Ex. 6 | D | D | B | 8.1 | C | C | C | D |
| Comp. Ex. 7 | D | D | D | 2.9 | C | C | D | D |
| Comp. Ex. 8 | D | D | D | 2.9 | C | C | D | D |
| Comp. Ex. 9 | D | D | D | 3.0 | C | D | D | |
| Comp. Ex. 10 | D | D | B | 6.8 | B | B | B | C |
| Comp. Ex. 11 | D | D | B | 5.0 | A | A | B | C |
| Comp. Ex. 12 | D | D | B | 11.6 | C | B | B | C |
| Comp. Ex. 13 | D | D | B | 12.4 | C | B | B | C |
| Comp. Ex. 14 | D | D | B | 5.6 | B | B | B | C |
| Comp. Ex. 15 | D | D | B | 6.1 | B | B | B | C |
| Ref. Ex. 1 | B | B | D | 3.1 | C | C | D | D |
| Ref. Ex. 2 | B | B | D | 3.0 | C | C | D | D |
| Ref. Ex. 3 | B | B | D | 2.9 | C | C | D | D |
| Ref. Ex. 4 | B | B | B | 7.0 | B | B | B | C |
| Ref. Ex. 5 | B | B | B | 6.9 | B | B | B | C |
| Ref. Ex. 6 | B | B | B | 6.5 | B | B | B | C |

TABLE 5

| | Composition | | | | | | | | | | | | |
|---|---|---|---|---|---|---|---|---|---|---|---|---|---|
| | Component (A) | | | | (Component B) SPS resin | | | (Component C) Polyphenylene ether | | Component (E) See Production Example | Component (D) Inorganic filler | | Knead-ing Resin temp. ° C. | Mold-ing Resin temp. ° C. |
| Ex., Comp. Ex., and Ref. Ex. | APS resin | | Rubber-like elastic substance | | | | | | | | | | | |
| | Type | Parts by weight | Type | Parts by weight | Type | m.p. | Parts by weight | Type | Parts by weight | Parts by weight | Type | wt. % | | |
| Ex. 21 | HT55 | 70 | — | 0 | SPS-1 | 240 | 30 | PPE-1 | 5 | 0 | — | 0 | 255 | 260 |
| Ex. 22 | HT55 | 70 | — | 0 | SPS-1 | 240 | 30 | PPE-1 | 10 | 0 | — | 0 | 255 | 260 |
| Ex. 23 | HT55 | 70 | — | 0 | SPS-1 | 240 | 30 | PPE-1 | 10 | 0 | — | 0 | 255 | 270 |
| Ex. 24 | HT55 | 70 | — | 0 | SPS-1 | 240 | 30 | PPE-1 | 10 | 0 | — | 0 | 255 | 245 |
| Ex. 25 | HT55 | 70 | — | 0 | SPS-1 | 240 | 30 | PPE-1 | 30 | 0 | — | 0 | 255 | 260 |
| Ex. 26 | HH55 | 70 | — | 0 | Sps-1 | 240 | 30 | PPE-1 | 50 | 0 | — | 0 | 255 | 260 |
| Ex. 27 | HT55 | 70 | — | 0 | SPS-1 | 240 | 30 | PPE-1 | 80 | 0 | — | 0 | 255 | 260 |
| Ex. 28 | HT55 | 70 | — | 0 | SPS-1 | 240 | 30 | PPE-2 | 5 | 0 | — | 0 | 255 | 260 |
| Ex. 29 | HT55 | 70 | — | 0 | SPS-1 | 240 | 30 | PPE-2 | 10 | 0 | — | 0 | 255 | 260 |
| Ex. 30 | HT55 | 60 | G1651 | 10 | SPS-1 | 240 | 30 | PPE-1 | 10 | 0 | — | 0 | 255 | 260 |
| Ex. 31 | HT55 | 60 | D1101 | 10 | SPS-1 | 240 | 30 | PPE-1 | 10 | 0 | — | 0 | 255 | 260 |
| Ex. 32 | HT55 | 60 | D1101 | 10 | SPS-1 | 240 | 30 | PPE-1 | 30 | 0 | — | 0 | 255 | 260 |
| Ex. 33 | HT55 | 60 | D1101 | 10 | SPS-1 | 240 | 30 | PPE-1 | 50 | 0 | — | 0 | 255 | 260 |
| Ex. 34 | HT55 | 60 | D1101 | 10 | SPS-1 | 240 | 30 | PPE-1 | 80 | 0 | — | 0 | 255 | 260 |
| Ex. 35 | HH31S | 60 | G1651 | 10 | SPS-1 | 240 | 30 | PPE-1 | 10 | 0 | — | 0 | 255 | 260 |
| Ex. 36 | HH31S | 60 | G1651 | 10 | SPS-1 | 240 | 30 | PPE-1 | 30 | 0 | — | 0 | 255 | 260 |
| Ex. 37 | HH31S | 60 | G1651 | 10 | SPS-1 | 240 | 30 | PPE-1 | 50 | 0 | — | 0 | 255 | 260 |
| Ex. 38 | HH31S | 60 | G1651 | 10 | SPS-1 | 240 | 30 | PPE-1 | 80 | 0 | — | 0 | 255 | 260 |
| Ex. 39 | HH31S | 60 | D110l | 10 | SPS-1 | 240 | 30 | PPE-1 | 10 | 0 | — | 0 | 255 | 260 |

TABLE 6

| Ex., Comp. Ex., and Ref. Ex. | Moldability Deformation upon release from mold | Molded product Shrink (Visual observation) | Surface Appearance (Visual observation) | Impact strength Izot with notch JIS-K7110 kJ/m² | Resistance to solvent Bath Magiclin Stress cracks Strain = 0.8% 80° C. × 1 hr | Soybean oil Stress cracks Strain = 0.8% 80° C. × 1 hr | MCT oil Appearance Strain = 0.8% r.t. × 1 hr | Freon 141B change r.t. × 1 hr |
|---|---|---|---|---|---|---|---|---|
| Ex. 21 | B | B | B | 10.0 | A | B | B | C |
| Ex. 22 | B | B | B | 11.0 | A | B | B | C |
| Ex. 23 | B | B | B | 11.0 | A | B | B | C |
| Ex. 24 | B | B | B | 11.1 | A | B | B | C |
| Ex. 25 | B | B | B | 12.0 | A | B | B | C |
| Ex. 26 | B | B | B | 12.7 | A | B | B | C |
| Ex. 27 | B | B | B | 13.0 | A | B | B | |
| Ex. 28 | B | B | B | 9.9 | A | B | B | C |
| Ex. 29 | B | B | B | 10.8 | A | B | B | C |
| Ex. 30 | B | B | B | 14.6 | B | B | B | C |
| Ex. 31 | B | B | B | 15.4 | B | B | B | C |
| Ex. 32 | B | B | B | 16.1 | B | B | B | C |
| Ex. 33 | B | B | B | 16.6 | B | B | B | C |
| Ex. 34 | B | B | B | 17.0 | B | B | B | C |
| Ex. 35 | B | B | B | 7.8 | A | B | B | C |
| Ex. 36 | B | B | B | 8.2 | A | B | B | C |
| Ex. 37 | B | B | B | 8.5 | A | B | B | C |
| Ex. 38 | B | B | B | 8.7 | A | B | B | C |
| Ex. 39 | B | B | B | 8.4 | A | B | B | C |

TABLE 7

| | Composition | | | | | | | | | | | | |
|---|---|---|---|---|---|---|---|---|---|---|---|---|---|
| | Component (A) | | | | | | (Component C) Polyphenylene ether | | Component (E) See Production Example | Component (D) Inorganic filler | | Knead-ing Resin temp. ° C. | Mold-ing Resin temp. ° C. |
| | APS resin | | Rubber-like elastic substance | | (Component B) SPS resin | | | | | | | | |
| Ex., Comp. Ex., and Ref. Ex. | Type | Parts by weight | Type | Parts by weight | Type | m.p. | Parts by weight | Type | Parts by weight | Parts by weight | Type | wt. % | | |
| Comp. Ex. 16 | HT55 | 70 | — | 0 | SPS-1 | 240 | 30 | PPE-3 | 5 | 0 | — | 0 | 255 | 260 |
| Comp. Ex. 17 | HT55 | 70 | — | 0 | SPS-1 | 240 | 30 | PPE-3 | 10 | 0 | — | 0 | 255 | 260 |
| Comp. Ex. 18 | HT55 | 70 | — | 0 | SPS-4 | 270 | 30 | PPE-1 | 10 | — | 0 | *280 | 280 | |
| Comp. Ex. 19 | HT55 | 70 | — | 0 | SPS-4 | 27o | 30 | PPE-2 | *10 | 0 | — | 0 | 280 | 280 |
| Comp. Ex. 20 | HT55 | 70 | — | 0 | SPS-4 | 270 | 30 | PPE-3 | 10 | 0 | — | 0 | 280 | 280 |
| Comp. Ex. 21 | HHSS | 60 | G1651 | 10 | SPS-4 | 270 | 30 | PPE-3 | 10 | 0 | — | 0 | 280 | 280 |
| Comp. Ex. 22 | HT55 | 60 | D1101 | 10 | SPS-4 | 270 | 30 | PPE-3 | 10 | 0 | — | 0 | 280 | 280 |
| Comp. Ex. 23 | HH31S | 60 | G1651 | 10 | SPS-4 | 270 | 30 | PPE-3 | 10 | 0 | — | 0 | 280 | 280 |
| Comp. Ex. 24 | HH31S | 60 | D1101 | 10 | SPS-4 | 270 | 30 | PPE-3 | 10 | 0 | — | 0 | 280 | 280 |
| Ref. Ex. 7 | HT55 | 70 | — | 0 | SPS-1 | 240 | 30 | PPE-1 | 10 | 0 | — | 0 | 280 | 260 |
| Ref. Ex. 8 | HT55 | 70 | — | 0 | SPS-1 | 240 | 30 | PPE-1 * | 10 | 0 | — | 0 | 230 | 260 |
| Ref. Ex. 9 | HT55 | 70 | — | 0 | SPS-1 | 240 | 30 | PPE-1 | 10 | 0 | — | 0 | 255 | 280 |
| Ref. Ex. 10 | HT55 | 70 | — | 0 | SPS-1 | 240 | 30 | PPE-1 | 10 | 0 | — | 0 | 255 | 230 |

TABLE 8

| Ex., Comp. Ex., and Ref. Ex. | Moldability Deformation upon release from mold | Molded product Shrink (Visual observation) | Surface Appearance (Visual observation) | Impact strength Izot with notch JIS-K7110 kJ/m² | Resistance to solvent | | | |
|---|---|---|---|---|---|---|---|---|
| | | | | | Bath Magiclin Stress cracks Strain = 0.8% 80° C. × 1 hr | Soybean oil Stress cracks Strain = 0.8% 80° C. × 1 hr | MCT oil Appearance Strain = 0.8% r.t. × 1 hr | Freon 141B change r.t. × 1 hr |
| Comp. Ex. 16 | B | B | B | 9.0 | A | B | B | C |
| Comp. Ex. 17 | B | B | B | 9.8 | A | B | B | C |
| Comp. Ex. 18 | D | D | B | 9.9 | B | B | B | D |
| Comp. Ex. 19 | D | D | B | 9.6 | B | B | B | D |
| Comp. Ex. 20 | D | D | B | 8.9 | B | B | B | D |
| Comp. Ex. 21 | D | D | B | 12.1 | C | B | B | D |
| Comp. Ex. 22 | D | D | B | 12.9 | C | B | B | D |
| Comp. Ex. 23 | D | D | B | 6.1 | B | B | B | D |
| Comp. Ex. 24 | D | D | B | 6.8 | B | B | B | D |
| Ref. Ex. 7 | B | B | B | 10.3 | A | B | B | C |
| Ref. Ex. 8 | B | B | D | 4.1 | C | C | D | D |
| Ref. Ex. 9 | D | D | B | 10.5 | A | B | B | C |
| Ref. Ex. 10 | B | B | D | 4.0 | C | C | D | D |

Examples 40 to 71, Comparative Examples 25 to 36, and Reference Examples 11 to 26

Components (A), (B), (C), and (E), and their proportions employed are shown in Tables 9, 11 and 13. Based on 100 parts by weight in total of components (A) to (E), there were also incorporated 0.1 part by weight of (2,6-di-t-butyl-4-methylphenyl)pentaerythritol diphosphite (by Asahi Denka; PEP-36, serving as an antioxidant), and 0.1 part by weight of tetrakis(methylene-3-(3', 5'-di-t-butyl-4'-hydroxyphenyl)) propionate (by Adeka-Agas; MARKAO 60). All components were dry-blended in a Henschel mixer. Subsequently, while glass fiber (Asahi Fiberglass, trade name: FT164, 10 µm/3 mm) was side-fed in amounts shown in Tables 9 and 11, the mixture was melt-kneaded for pelletization.

Resin temperatures during kneading and molding are set as shown in Tables 9, 11 and 13.

Note that the amount of component (D) is shown in % by weight with respect to the total weight of the composition; the amount of component (E) is shown in parts by weight with respect to 100 parts by weight in total of components (A) and (B) or with respect to 100 parts by weight in total of components (A), (B), and (C).

The results are shown in Tables 10, 12 and 14.

TABLE 9

| | Composition | | | | | | | | | | | | |
|---|---|---|---|---|---|---|---|---|---|---|---|---|---|
| | Component (A) | | | | Component (B) SPS resin | | | Component (C) Polyphenylene ether | | Component (E) See Production Example | Component (D) Inorganic filler | | Knead-ing Resin temp. ° C. | Mold-ing Resin temp. ° C. |
| | APS resin | | Rubber-like elastic substance | | | | | | | | | | | |
| Ex. And Comp. Ex. | Type | Parts by weight | Type | Parts by weight | Type | m.p. | Parts by weight | Type | Parts by weight | Parts by weight | Type | wt. % | | |
| Ex. 40 | HT55 | 70 | — | 0 | SPS-1 | 240 | 30 | — | 0 | 2 | FT164 | 30 | 255 | 260 |
| Ex. 41 | HT55 | 70 | — | 0 | SPS-1 | 240 | 30 | — | 0 | 2 | FT164 | 30 | 255 | 270 |
| Ex. 42 | HT55 | 70 | — | 0 | SPS-1 | 246 | 30 | — | 0 | 2 | FT164 | 30 | 255 | 245 |
| Ex. 43 | HT55 | 60 | G1651 | 10 | SPS-1 | 240 | 30 | — | 0 | 2 | FT164 | 30 | 255 | 260 |
| Ex. 44 | HT55 | 60 | D1101 | 10 | SPS-1 | 240 | 30 | — | 0 | 2 | FT164 | 30 | 255 | 260 |
| Ex. 45 | HH55 | 70 | — | 0 | SPS-1 | 240 | 30 | PPE-1 | 10 | 2 | FT164 | 30 | 255 | 260 |
| Ex. 46 | HT55 | 70 | — | 0 | SPS-1 | 240 | 30 | PPE-1 | 10 | 2 | FT164 | 30 | 255 | 270 |
| Ex. 47 | HT55 | 70 | — | 0 | SPS-1 | 240 | 30 | PPE-1 | 10 | 2 | FT164 | 30 | 255 | 245 |
| Ex. 48 | HT55 | 70 | — | 0 | SPS-1 | 240 | 30 | PPE-1 | 30 | 2 | FT164 | 30 | 255 | 260 |
| Ex. 49 | HT55 | 70 | — | 0 | SPS-1 | 240 | 30 | PPE-1 | 50 | 2 | FT164 | 30 | 255 | 260 |
| Ex. 50 | HT55 | 70 | — | 0 | SPS-1 | 240 | 30 | PPE-1 | 80 | 2 | FT164 | 30 | 255 | 260 |
| Ex. 51 | HT55 | 60 | G1651 | 10 | SPS-1 | 240 | 30 | PPE-1 | 10 | 2 | FT164 | 30 | 255 | 260 |
| Ex. 52 | HT55 | 60 | D1101 | 10 | SPS-1 | 240 | 30 | PPE-1 | 10 | 2 | FT164 | 30 | 255 | 260 |
| Ex. 53 | HT55 | 60 | D1101 | 10 | SPS-1 | 240 | 30 | PPE-1 | 30 | 2 | FT164 | 30 | 255 | 260 |
| Ex. 54 | HT5S | 60 | D1101 | 10 | SPS-1 | 240 | 30 | PPE-1 | 50 | 2 | FT164 | 30 | 255 | 260 |
| Ex. 55 | HT55 | 60 | D1101 | 10 | SPS-1 | 240 | 30 | PPE-1 | 80 | 2 | FT164 | 30 | 255 | 260 |
| Ex. 56 | HH31S | 70 | — | 0 | SPS-1 | 240 | 30 | — | 0 | 2 | FT164 | 30 | 255 | 260 |
| Ex. 57 | HH31S | 70 | — | 0 | SPS-1 | 240 | 30 | — | 0 | 2 | FT164 | 30 | 255 | 270 |
| Ex. 58 | HH31S | 70 | — | 0 | SPS-1 | 240 | 30 | — | 0 | 2 | FT164 | 30 | 255 | 245 |
| Ex. 59 | HH31S | 60 | G1651 | 10 | SPS-1 | 240 | 30 | — | 0 | 2 | FT164 | 30 | 255 | 260 |

TABLE 10

| Ex. and Comp. Ex. | Moldability Deformation upon release from mold | Molded product Shrink (Visual observation) | Surface Appearance (Visual observation) | Impact strength Izot With notch JIS-K7110 KJ/m² | Resistance to solvent Bath Magiclin Stress cracks Strain = 0.8% 80° C. × 1 hr | Soybean oil Stress cracks Strain = 0.8% 80° C. × 1 hr | MCT oil Stress cracks Strain = 0.8% r.t. × 1 hr | Soaking Appearance change r.t. × 1 hr |
|---|---|---|---|---|---|---|---|---|
| Ex. 40 | B | B | B | 10.3 | A | B | B | C |
| Ex. 41 | B | B | B | 10.3 | A | B | B | C |
| Ex. 42 | B | B | B | 10.5 | A | B | B | C |
| Ex. 43 | B | B | B | 11.5 | B | B | B | C |
| Ex. 44 | B | B | B | 12.6 | B | B | B | C |
| Ex. 45 | B | B | B | 11.1 | A | B | B | C |
| Ex. 46 | B | B | B | 11.0 | A | B | B | C |
| Ex. 47 | B | B | B | 11.2 | A | B | B | C |
| Ex. 48 | B | B | B | 11.5 | A | B | B | C |
| Ex. 49 | B | B | B | 11.9 | A | B | B | C |
| Ex. 50 | B | B | B | 12.3 | A | B | B | C |
| Ex. 51 | B | B | B | 12.6 | B | B | B | C |
| Ex. 52 | B | B | B | 13.5 | B | B | C | |
| Ex. 53 | B | B | B | 13.8 | A | B | B | C |
| Ex. 54 | B | B | B | 14.0 | A | B | B | C |
| Ex. 55 | B | B | B | 14.1 | A | B | B | C |
| Ex. 56 | B | B | B | 9.0 | A | B | B | C |
| Ex. 57 | B | B | B | 9.0 | A | B | B | C |
| Ex. 58 | B | B | B | 9.2 | A | B | B | C |
| Ex. 59 | B | B | B | 10.0 | A | B | B | C |

TABLE 11

| | Composition | | | | | | | | | | | |
|---|---|---|---|---|---|---|---|---|---|---|---|---|
| | Component (A) | | | | Component (B) SPS resin | | | Component (C) Polyphenylene ether | | Component (E) See Production Example | Component (D) Inorganic filler | | Knead-ing Resin temp. ° C. | Mold-ing Resin temp. ° C. |
| | APS resin | | Rubber-like elastic substance | | | | | | | | | | |
| Ex., Comp. Ex., and Ref. Ex. | Type | Parts by weight | Type | Parts by weight | Type | m.p. | Parts by weight | Type | Parts by weight | Parts by weight | Type | wt. % | | |
| Ex. 60 | HH31S | 60 | D1101 | 10 | SPS-1 | 240 | 30 | — | 0 | 2 | FT164 | 3300 | 255 | 260 |
| Ex. 61 | HH31S | 70 | — | 0 | SPS-1 | 240 | 30 | PPE-1 | 10 | 2 | FT164 | 30 | 255 | 260 |
| Ex. 62 | HH31S | 70 | — | 0 | SPS-1 | 240 | 30 | PPE-1 | 10 | 2 | FT164 | 30 | 255 | 270 |
| Ex. 63 | HH31S | 70 | — | 0 | SPS-1 | 240 | 30 | PPE-1 | 10 | 2 | FT164 | 30 | 255 | 245 |
| Ex. 64 | HH31S | 70 | — | 0 | SPS-1 | 240 | 30 | PPE-1 | 30 | 2 | FT164 | 30 | 255 | 260 |
| Ex. 65 | HH31S | 70 | — | 0 | SPS-1 | 240 | 30 | PPE-1 | 50 | 2 | FT164 | 30 | 255 | 260 |
| Ex. 66 | HH31S | 70 | — | 0 | SPS-1 | 240 | 30 | PPE-1 | 80 | 2 | FT164 | 30 | 255 | 260 |
| Ex. 67 | HH31S | 60 | G1651 | 10 | SPS-1 | 240 | 30 | PPE-1 | 10 | 2 | FT164 | 30 | 255 | 260 |
| Ex. 68 | HH3IS | 60 | G1651 | 10 | SPS-1 | 240 | 30 | PPE-1 | 30 | 2 | FT164 | 30 | 255 | 260 |
| Ex. 69 | HH31S | 60 | G1651 | 10 | SPS-1 | 240 | 30 | PPE-1 | 50 | 2 | FT164 | 30 | 255 | 260 |
| Ex. 70 | HH31S | 60 | G1651 | 10 | SPS-1 | 240 | 30 | PPE-1 | 80 | 2 | FT164 | 30 | 255 | 260 |
| Ex. 71 | HH31S | 60 | D1101 | 10 | SPS-1 | 240 | 30 | PPE-1 | 10 | 2 | FT164 | 30 | 255 | 260 |
| Comp. Ex. 25 | HT5S | 70 | — | 0 | SPS-4 | 270 | 30 | — | 0 | 2 | FT164 | 30 | 280 | 280 |
| Comp. Ex. 26 | HT55 | 60 | G1651 | 10 | SPS-4 | 270 | 30 | — | 0 | 2 | FT164 | 30 | 280 | 280 |
| Comp. Ex. 27 | HT55 | 60 | D1101 | 10 | SPS-4 | 270 | 30 | — | 0 | 2 | FT164 | 30 | 280 | 280 |
| Comp. Ex. 28 | HT55 | 70 | — | 0 | SPS-4 | 270 | 30 | PPE-3 | 10 | 2 | FT164 | 30 | 280 | 280 |
| Comp. Ex. 29 | HT55 | 60 | G1651 | 10 | SPS-4 | 270 | 30 | PPE-3 | 10 | 2 | FT164 | 30 | 280 | 280 |
| Comp. Ex. 30 | HT5S | 60 | D1101 | 10 | SPS-4 | 270 | 30 | PPE-3 | 10 | 2 | FT164 | 30 | 280 | 280 |
| Comp. Ex. 31 | HH31S | 70 | — | 0 | SPS-4 | 270 | 30 | — | 0 | 2 | FT164 | 30 | 280 | 280 |
| Comp. Ex. 32 | HH31S | 60 | G1651 | 10 | SPS-4 | 270 | 30 | — | 0 | 2 | FT164 | 30 | 280 | 280 |

TABLE 12

| Ex., Comp. Ex., and Ref. Ex. | Moldability Deformation upon release from mold | Molded product Shrink (Visual observation) | Surface Appearance (Visual observation) | Impact strength Izot With notch JIS-K7110 KJ/m$^2$ | Resistance to solvent Bath Magiclin Stress cracks Strain = 0.8% 80° C. × 1 hr | Soybean oil Stress cracks Strain = 0.8% 80° C. × 1 hr | MCT oil Stress cracks Strain = 0.8% r.t. × 1 hr | Soaking Appearance change r.t. × 1 hr |
|---|---|---|---|---|---|---|---|---|
| Ex. 60 | B | B | B | 10.6 | A | B | B | C |
| Ex. 61 | B | B | B | 10.0 | A | B | B | C |
| Ex. 62 | B | B | B | 10.0 | A | B | B | C |
| Ex. 63 | B | B | B | 10.1 | A | B | B | C |
| Ex. 64 | B | B | B | 10.5 | A | B | B | C |
| Ex. 65 | B | B | B | 10.9 | A | B | B | C |
| Ex. 66 | B | B | B | 11.3 | A | B | B | C |
| Ex. 67 | B | B | B | 11.0 | A | B | B | C |
| Ex. 68 | B | B | B | 11.5 | A | B | B | C |
| Ex. 69 | B | B | B | 11.7 | A | B | B | C |
| Ex. 70 | B | B | B | 11.9 | A | B | B | C |
| Ex. 71 | B | B | B | 11.4 | A | B | B | C |
| Comp. Ex. 25 | B | D | B | 9.1 | A | B | B | C |
| Comp. Ex. 26 | B | D | B | 10.3 | B | B | B | |
| Comp. Ex. 27 | B | D | B | 11.2 | B | B | B | C |
| Comp. Ex. 28 | — | — | — | 9.5 | A | B | B | C |
| Comp. Ex. 29 | B | D | B | 10.8 | B | B | B | C |
| Comp. Ex. 30 | B | D | B | 11.6 | B | B | B | C |
| Comp. Ex. 31 | B | D | B | 7.9 | A | B | B | C |
| Comp. Ex. 32 | B | D | B | 8.8 | A | B | B | C |

TABLE 13

| | Composition | | | | | | | | | | | | |
|---|---|---|---|---|---|---|---|---|---|---|---|---|---|
| | Component (A) | | | | Component (B) SPS resin | | | Component (C) Polyphenylene ether | | Component (E) See Production Example | Component (D) Inorganic filler | | Knead- ing Resin temp. ° C. | Mold- ing Resin temp. ° C. |
| | APS resin | | Rubber-like elastic substance | | | | | | | | | | | |
| Ex., Comp. Ex., and Ref. Ex. | Type | Parts by weight | Type | Parts by weight | Type | m.p. | Parts by weight | Type | Parts by weight | Parts by weight | Type | wt. % | | |
| Comp. Ex. 33 | HH31S | 60 | D1101 | 10 | SPS-4 | 270 | 30 | — | 0 | 2 | FT164 | 30 | 280 | 280 |
| Comp. Ex. 34 | HH31S | 70 | — | 0 | SPS-4 | 270 | 30 | PPE-3 | 10 | 2 | FT164 | 30. | 280 | 280 |
| Comp. Ex. 35 | HH31S | 60 | G1651 | 10 | SPS-4 | 270 | 30 | PPE-3 | 10 | 2 | FT164 | 30 | 280 | 280 |
| Comp. Ex. 36 | HH31S | 60 | D1101 | 10 | SPS-4 | 270 | 30 | PPE-3 | 10 | 2 | FT164 | 30 | 280 | 280 |
| Ref. Ex. 11 | HT55 | 70 | — | 0 | SPS-1 | 240 | 30 | — | 0 | 2 | FT164 | 30 | 280 | 260 |
| Ref. Ex. 12 | HT55 | 70 | — | 0 | SPS-1 | 240 | 30 | — | 0 | 2 | FT164 | 30 | 230 | 260 |
| Ref. Ex. 13 | HT55 | 70 | — | 0 | SPS-1 | 240 | 30 | — | 0 | 2 | FT164 | 30 | 255 | 280 |
| Ref. Ex. 14 | HT55 | 70 | — | 0 | SPS-1 | 240 | 30 | — | 0 | 2 | FT164 | 30 | 255 | 230 |
| Ref. Ex. 15 | HT55 | 70 | — | 0 | SPS-1 | 240 | 30 | PPE-1 | 10 | 2 | FT164 | 30 | 280 | 260 |
| Ref. Ex. 16 | HT55 | 70 | — | 0 | SPS-1 | 240 | 30 | PPE-1 | 10 | 2 | FT164 | 30 | 230 | 260 |
| Ref. Ex. 17 | HT55 | 70 | — | 0 | SPS-1 | 240 | 30 | PPE-1 | 10 | 2 | FT164 | 30 | 255 | 280 |
| Ref. Ex. 18 | HT55 | 70 | — | 0 | SPS-1 | 240 | 30 | PPE-1 | 10 | 2 | FT164 | 30 | 255 | 230 |
| Ref. Ex. 19 | HH31S | 70 | — | 0 | SPS-1 | 240 | 30 | — | 0 | 2 | FT164 | 30 | 280 | 260 |
| Ref. Ex. 20 | HH31S | 70 | — | 0 | SPS-1 | 240 | 30 | — | 0 | 2 | FT164 | 30 | 230 | 260 |
| Ref. Ex. 21 | HH31S | 70 | — | 0 | SPS-1 | 240 | 30 | — | 0 | 2 | FT164 | 30 | 255 | 280 |
| Ref. Ex. 22 | HH31S | 70 | — | 0 | SPS-1 | 240 | 30 | — | 0 | 2 | FT164 | 30 | 255 | 230 |
| Ref. Ex. 23 | HH31S | 70 | — | 0 | SPS-1 | 240 | 30 | PPE-1 | 10 | 2 | FT164 | 30 | 280 | 260 |
| Ref. Ex. 24 | HH31S | 70 | — | 0 | SPS-1 | 240 | 30 | PPE-1 | 10 | 2 | FT164 | 30 | 230 | 260 |
| Ref. Ex. 25 | HH31S | 70 | — | 0 | SPS-1 | 240 | 30 | PPE-1 | 10 | 2 | FT164 | 30 | 255 | 280 |
| Ref. Ex. 26 | HH31S | 70 | — | 0 | SPS-1 | 240 | 30 | PPE-1 | 10 | 2 | FT164 | 30 | 255 | 230 |

TABLE 14

| Ex., Comp. Ex., and Ref. Ex. | Moldability — Deformation upon release from mold | Molded product — Shrink (Visual observation) | Surface — Appearance (Visual observation) | Impact strength Izot With notch JIS-K7110 KJ/m² | Resistance to solvent | | | |
|---|---|---|---|---|---|---|---|---|
| | | | | | Bath Magiclin Stress cracks Strain = 0.8% 80° C. × 1 hr | Soybean oil Stress cracks Strain = 0.8% 80° C. × 1 hr | MCT oil Stress cracks Strain = 0.8% r.t. × 1 hr | Soaking Appearance change r.t. × 1 hr |
| Comp. Ex. 33 | B | D | B | 9.3 | A | B | B | C |
| Comp. Ex. 34 | B | D | B | 8.5 | A | B | B | C |
| Comp. Ex. 35 | B | D | B | 9.5 | A | B | B | C |
| Comp. Ex. 36 | B | D | B | 10.0 | A | B | B | C |
| Ref. Ex. 11 | B | B | B | 9.5 | A | B | B | C |
| Ref. Ex. 12 | B | B | D | 6.0 | C | C | D | D |
| Ref. Ex. 13 | D | D | B | 9.4 | A | B | B | C |
| Ref. Ex. 14 | B | B | D | 6.0 | C | C | D | D |
| Ref. Ex. 15 | B | B | B | 9.9 | A | B | B | C |
| Ref. Ex. 16 | B | B | D | 6.6 | C | C | D | D |
| Ref. Ex. 17 | D | D | B | 9.9 | A | B | B | C |
| Ref. Ex. 18 | B | B | D | 6.5 | C | C | D | D |
| Ref. Ex. 19 | B | B | B | 8.4 | A | B | B | C |
| Ref. Ex. 20 | B | B | D | 4.6 | C | C | D | D |
| Ref. Ex. 21 | D | D | B | 8.3 | A | B | B | C |
| Ref. Ex. 22 | B | B | D | 4.5 | C | C | D | D |
| Ref. Ex. 23 | B | B | B | 9.0 | A | B | B | C |
| Ref. Ex. 24 | B | B | D | 5.1 | C | C | D | D |
| Ref. Ex. 25 | D | D | B | 9.1 | A | B | B | C |
| Ref. Ex. 26 | B | B | D | 5.2 | C | C | D | D |

As described above, the present invention enables to provide APS resin compositions having improved solvent resistance, excellent moldability, and remarkable impact resistance without use of any special compatibilizers. Also, the present invention provides a method for producing such APS resin compositions, and a method for manufacturing APS resin molded articles. The styrene resin compositions of the present invention are advantageously used for fabrication of a variety of injection-molded articles; extrusion-molded articles such as sheets and films; and extrusion-heat application molded products such as a variety of containers and trays; extrusion and stretched articles such as uniaxial or biaxial oriented films, sheet, and fibrous articles obtained through fiber making methods.

What is claimed is:

1. A styrene resin composition, which comprises the following components (A) and (B):
   (A) from 30 to 95% by weight of a styrene polymer having an atactic structure; and
   (B) from 70 to 5% by weight of a styrene polymer having a melting point of not higher that 255° C. and having predominantly a syndiotactic structure.

2. A styrene resin composition, which comprises the following components (A) and (B):
   (A) from 30 to 95% by weight of a styrene polymer having an atactic structure and containing a rubber-like elastic substance; and
   (B) from 70 to 5% by weight of a styrene polymer having a melting point of not higher that 255 ° C. and having predominantly a syndiotactic structure.

3. A method of producing a styrene resin composition as described in claim 1 or 2, which method comprises kneading the respective components within a resin temperature range between the melting point of component (B) and 270° C. inclusive.

4. A method of manufacturing a styrene resin molded product through use of a styrene resin composition as described in claim 1 or 2, which method comprises molding the composition within a resin temperature range between the melting point of component (B) and 270° C. inclusive as measured during molding.

* * * * *